April 24, 1934.  E. S. BUSH  1,955,845
ENGINE AND TRANSMISSION CONTROL
Filed Jan. 3, 1933  3 Sheets-Sheet 1

INVENTOR.
EUGENE S. BUSH
By Roy W. Wilson
ATTORNEY

April 24, 1934.  E. S. BUSH  1,955,845
ENGINE AND TRANSMISSION CONTROL
Filed Jan. 3, 1933  3 Sheets-Sheet 3

INVENTOR.
EUGENE S. BUSH
BY
ATTORNEY

Patented Apr. 24, 1934

1,955,845

UNITED STATES PATENT OFFICE 1,955,845

ENGINE AND TRANSMISSION CONTROL

Eugene S. Bush, St. Louis, Mo., assignor to Bush Manufacturing Company, St. Louis, Mo., a corporation of Missouri Application January 3, 1933, Serial No. 649,791

20 Claims. (Cl. 192—.01)

This invention relates to improvements in engine and transmission controls, and more particularly to an improved structural organization for coordinating engine throttle movement, with speed change control movement, for example in an automotive vehicle.

An object of the invention may be generally stated as attained in an improved and simplified assembly of controls, whereby an automobile engine, for example, is automatically accelerated and decelerated, appropriately to and conformably with, the several gear change ratios in a transmission with which the engine is operatively coupled. This object is attained in the provision of means for effecting a predetermined sequence of engine throttle control movements, coordinately with, and responsive to the movement of a transmission control member, through the range of its movement normally utilized for shifting into and through the different gear ratios of a transmission, for example, of an automobile.

Another object of the invention is attained in a simplified and improved assembly of control elements, such that it is possible to manipulate, coordinate'y, a clutch, transmission, and engine throttle, through manipulation of a single combined control member therefor.

A further important object is attained in a simplified arrangement of control members, such that the operations of throttle control, gear ratio selection, and clutch manipulation, are rendered uniform, and are automatically standardized, whereby the operator is relieved of any mental effort, and the speeds of the prime mover and gearing are automatically coordinated for best results in shifting between gear ratios.

Figure 1:
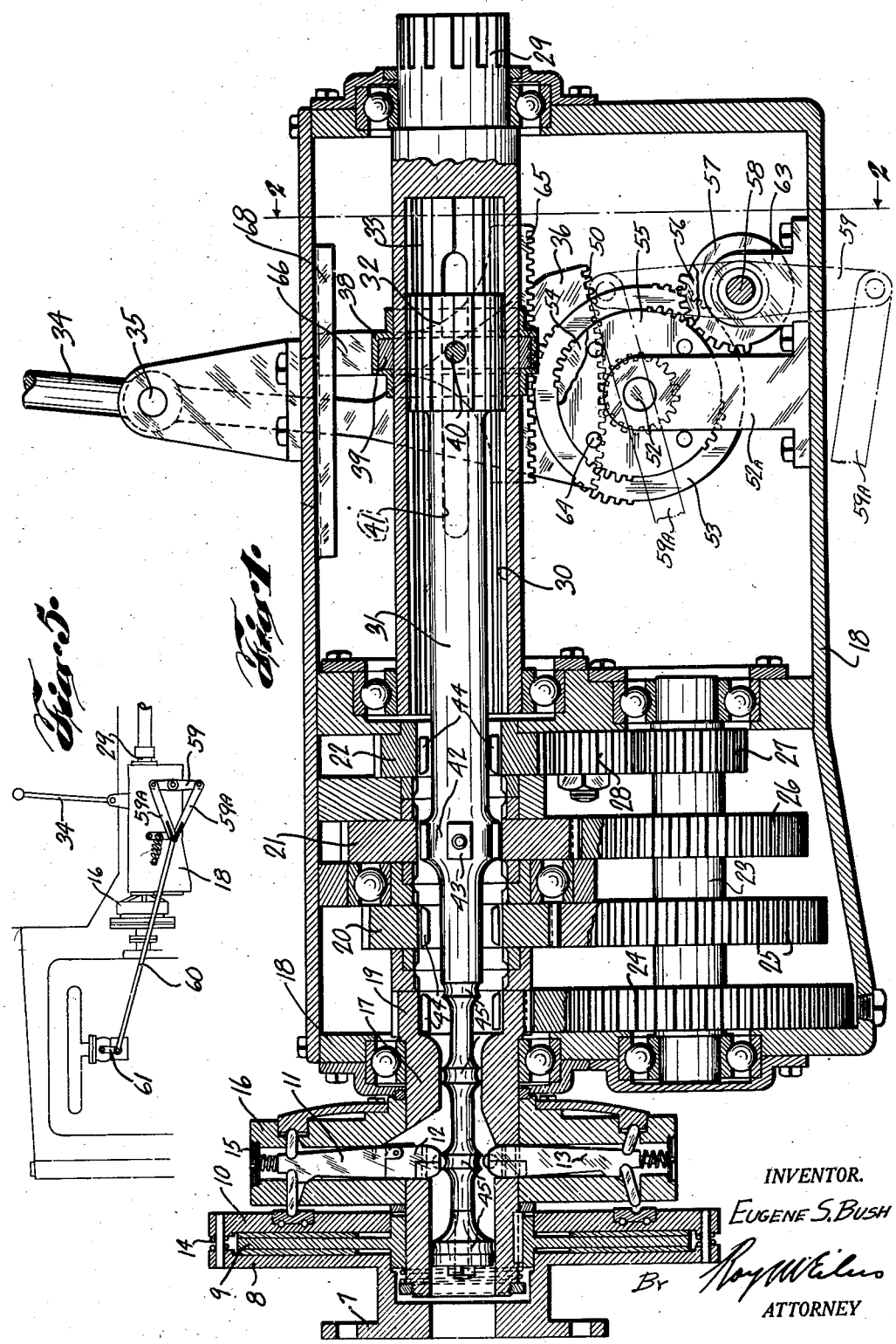
Figure 2:
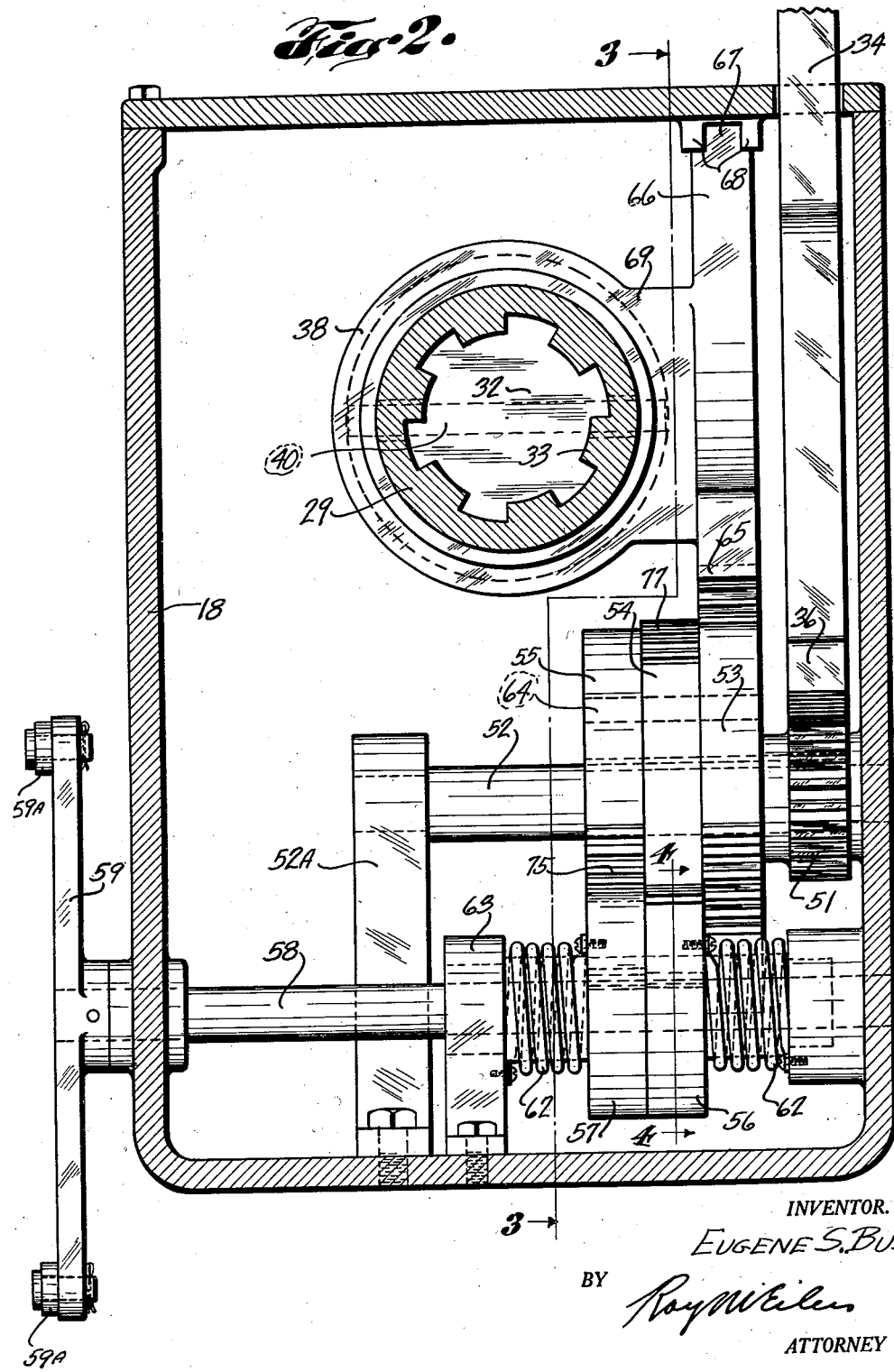
Figure 3:
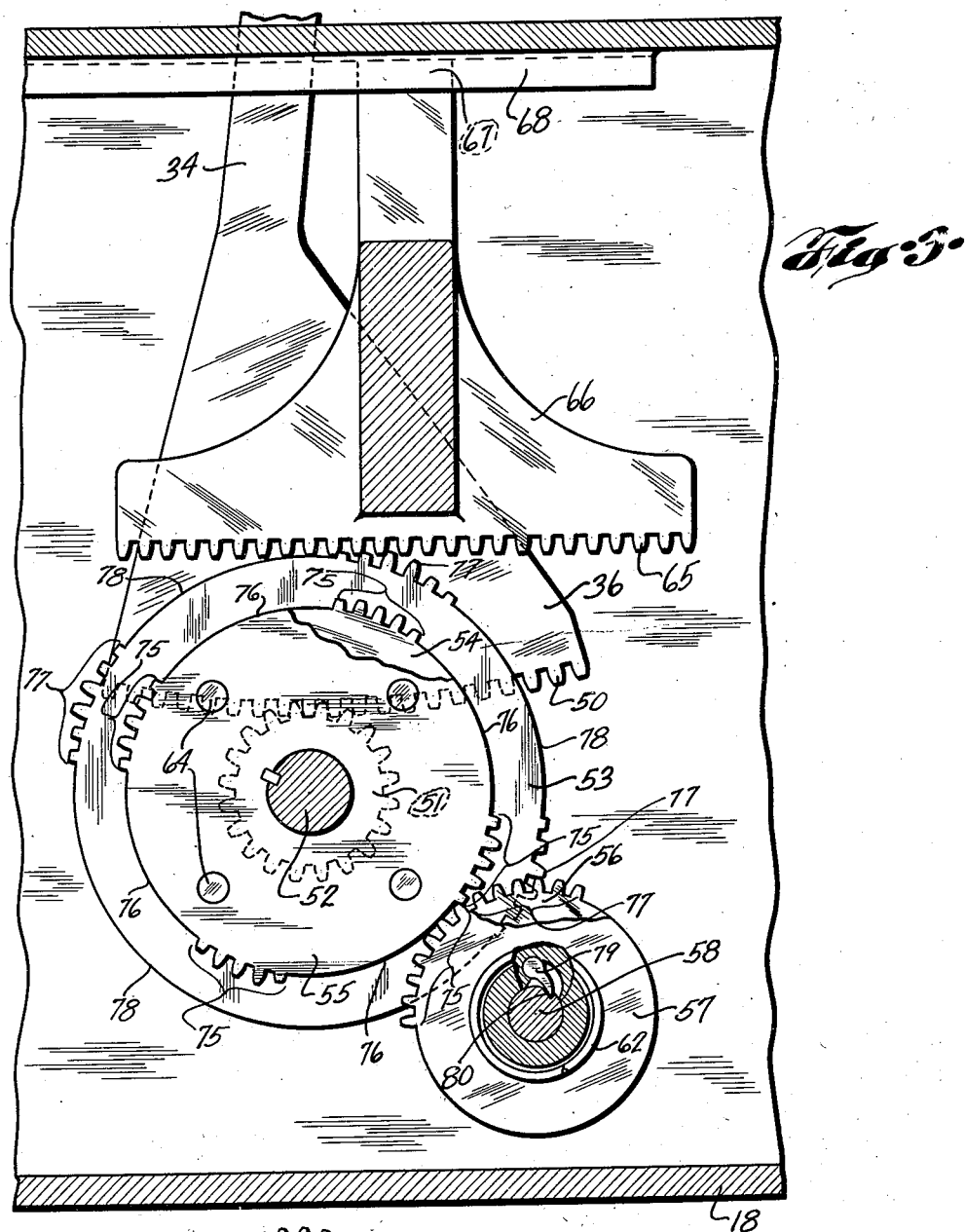
Figure 4:
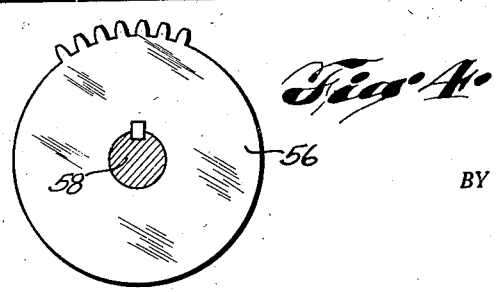

Further objects and advantages of the invention wi'l appear from the ensuing detailed description of an embodiment exemplifying the invention, and from the accompanying drawings thereof, in which:

Fig. 1 is a vertical, longitudinal, sectional elevation through a transmission, clutch and throttle control assembly, in which is incorporated the principles of the present invention; Fig. 2 is a transverse, vertical section as viewed along line 2—2 of Fig. 1; Fig. 3 is an enlarged fragmentary vertical section through a portion of the transmission case, as viewed along line 3—3 of Fig. 2, and illustrating certain details of the throttle control organization; Fig. 4 is a sectional elevation of a gear such as employed in connection with the throttle control assembly, Fig. 4 being taken along line 4—4 of Fig. 2, and Fig. 5 is a diagrammatic side elevation, showing a convenient manner of operatively connecting the assembly of Fig. 3, to a throttle of an internal combustion engine.

The transmission and clutch assembly shown particularly in Fig. 1 constitutes, of itself, no part of the present invention, but is particularly described and claimed in my copending application of Serial No. 585,683, filed January 9, 1932. It may be noted for purposes of the present description that connection is made to an engine or other prime mover, through a flanged hub or like member 7, extended to form an element 8 of a friction clutch assembly. Companion plates or discs of the clutch are indicated at 9 and 10, the clutch being engageable and disengageable through a plurality of radially movable plungers, some of which, indicated at 11, are provided with hinged inner ends 12, and others, such as plungers 13, being of relatively rigid construction, and somewhat less length than the plungers 11. Clutch elements 8 and 10 are biased apart as by springs 14, and the plungers are biased inwardly toward clutch-disengaging position as by springs 15, the clutch-actuating assembly being carried internally of a housing 16, mounted on a hollow rotatable power shaft 17, extending within the transmission case 18. The speed-change gearing of the transmission presently illustrated is identified with a plurality of aligned, spaced, centrally hollow gears 19, 20, 21 and 22, these gears being so assembled as to form a continuous passage of bore therethrough, for a purpose hereinafter appearing.

Carried by a countershaft 23 are a plurality of gears 24, 25, 26 and 27, each of gears 24 through 27 being secured to the shaft 23, and the gears 24 through 26 meshing respectively with gears numbered 19 through 21. The gear 27 constitutes a reverse driving gear, and operates through an idler 28 to actuate the gear 22 as appears in Fig. 1.

The power take-off shaft, which may serve as a connection to the propeller shaft of an automotive vehicle, is indicated at 29, and is provided throughout its forward end with a longitudinal bore 30 in which there is disposed for endwise movement, a combined transmission shaft and shiftable power member indicated at 31. The shaft 31 is provided with an externally splined head 32, the splines thereof engaging corresponding internal splines 33 within and along the bore 30 of shaft 29. By this provision, even though the shaft 31 is moved endwise for speed change control, as hereinafter appears, this shaft is always kept in rotative, operative connection with the propeller shaft 29.

Speed-change movements of the shaft 31 are brought about through a control lever, indicated fragmentarily at 34, arranged for movement about a fixed pivot 35 and extending downwardly in the case 18 through a notching and closure member (not shown), movable endwise upon the case, the notches of the closure member coacting with a spring-pressed plunger in a manner tending to position the lever 34 in its several "free-running" positions, in which the shaft 31 is free of driving connection with any of the driving elements of the transmission.

That portion of the lever 34 which extends within the case 18, as through a suitable slot provided therefor, terminates inwardly in an arcuate rack element generally designated at 36. This rack has conection through parts hereinafter described, to a nonrotatable collar 38, within which is rotatably mounted an additional annulus or collar 39 connected as by a pin 40, for rotation with both of the shafts 29 and 31. The pin 40, while rotatively adapted to lock these shafts together, extends outwardly through elongate diametrally opposed slots 41, in the hollow portion of shaft 29, the slots permitting endwise movement of the shaft 31 and pin 40, without producing any tendency toward endwise movement of shaft 29. The arrangement is thus such that, as the lever 34 is moved about its pivot 35, there results under certain conditions a corresponding endwise movement of shaft 31, for purposes of speed change control, as well as clutch control, as hereinafter appears.

The shaft 31 is provided with a driving head 42 characterized by a plurality of radial abutments or projections 43 which serve, when the driving head is brought to a position within one of the gears 19, 20, 21 or 22, to be engaged by spaced spring-pressed pawls 44, there being preferably at least a pair of such pawls within each of the gears 19—22, and the arrangement being such that the driving head 42 may be freely moved through or into any of the gears 19—22, due to outward or radial displacement of the pawls 44 by abutments 43. The arrangement is further such that when the head 42 is positioned in driving engagement within the center pockets in any one of the gears 19—22, the abutments 43 and pawls 44 coact to establish a driving connection between the selected gear and the shaft 31.

The shaft 31 serves also the purpose of actuating the friction clutch plates 8, 9 and 10 coordinately with, preferably following the establishment of the several operative connections with the gears 19—22. Clutch actuation is effected through a series of cams or nodes 45, spaced along the left hand end (Fig. 1), of shaft 31, conformably to the spacing between centers of the gears 19—22. The relation between the cams 45 and gear-engaging head 42, is preferably such that, as shaft 31 is moved to the left (Fig. 1), the head 42 serves to bring one of the gears 19—22 into driving engagement with the shaft, slightly in advance of engagement of the friction clutch. This clutch actuation is effected, as will appear from the drawings, by outward radial movement of one group of plungers, such as 11, responsively to movement of one of the cams 45, into the plane of the plungers.

It will appear from the foregoing that a unidirectional movement of the speed change control lever 34, serves to effect both a full transmission control, consisting of several predetermined speed-change settings, and serves also to effect, coordinately but sequentially therewith, a series of clutch-engaging and disengaging movements.

Due to the resilient mounting of the pawls 44, the driving head 42 is free to move without obstruction to its control movement, into or through the gears 19—22. As before noted, a plurality of the clutch-actuating plungers 11 are provided with hinged inner ends 12, there being also provided a separate group or set of the plungers 13, somewhat shorter in length than the plungers 11. It will appear that the endmost clutch cam 45 is also of greater diameter than those disposed inwardly of the end of shaft 31, with the result that only the larger clutch cam actuates the shortest plungers such as 13, and that this takes place only when the shaft 31 is positioned to bring the driving head 42 in driven engagement with the reverse gear 22. In the other, forward speed positions, due to the hinged inner ends 12 of plungers 11, the smaller clutch heads 45 actuate the plungers 11, and hence the clutch, in sequence, only as the shaft 31 is moved to the left (Fig. 1) as in proceeding from lower, to and through the higher gear ratios. Upon the reverse movement of shaft 31, the hinged inner ends 12 of plungers 11 are deflected laterally, to the right, and thus the clutch is not actuated sequentially during movement of the shaft 31 from higher to lower gear ratios, all of which will more fully appear.

Proceeding now to a description of the several parts and the operation of the throttle control assembly, it will appear that, particularly in automotive practice, the speed change control movements are most desirably effected at definite vehicle speeds, considered in connection with engine speeds which correspond, through the different gear ratios, to the speeds of the vehicle. It is obviously possible to represent graphically the speed of the engine corresponding to vehicle speed, given any definite gear ratio. Shifting from one speed ratio to another may obviously be effected with maximum smoothness, assuming the engine to be accelerated along a line connecting the engine-car speed curves at points corresponding to the speed of the vehicle at which it has been determined as most desirable to effect speed changes.

This result is automatically accomplished in the example of the present disclosure, by the engagement of teeth 50 on the arcuate rack end of member 36, with a pinion 51, which is secured as by a suitable key or the like, to a shaft 52. This shaft serves also to carry a transmission control gear 53, connections from which are hereinafter described, and a pair of throttle control pinions 54 and 55. The shaft 52 is conveniently journaled at one end in the wall 18 of the case and at its opposite end within the case in a bearing arm 52A.

The pinions 54 and 55 are enmeshed, respectively, with a pair of pinions 56 and 57 carried by a rock shaft 58, one end of which extends through the wall 18 of the transmission case and the projecting end being provided with a double ended lever or crank 59, suitably connected as through a rod 60, to the throttle 61 of the engine (Fig. 5). As will appear, the rod 60 is spring retracted to its normal throttle-closing position.

Since the movement of the rock shaft 58, as will hereinafter appear, takes place in opposite directions to cause acceleration of the engine, the crank 59 is preferably a double ended element, centrally secured to the shaft 58 as shown, and pivotally connected through paired links 59A, each provided with a slotted end, to the throttle control rod 60. This special form of connection thus provides for throttle opening movement, whether the rock shaft is rotated clockwise or anticlockwise from its position of rest, as determined by the direction of actuation of lever 34.

As a means of centering, or maintaining the double ended lever 59 in its normal or vertical position, there is provided a torsion spring 62, having one end anchored in a stationary element such as a bearing arm 63 on the one side, and terminally anchored to pinion 57 on the other. The spring 62 is stressed whenever pinion 57 is rotated away from its normal position of rest, as appears in Fig. 2. There is also optionally provided a second spring 62, anchored at one end to the case, or to some stationary element, and anchored at its opposite end to gear 56, which is secured to the rock shaft 58. The latter spring thus tends to restore the rock shaft, as well as the arm 59, to a normal position of rest, following movement of these parts for purposes of throttle opening.

Although the gears 53, 54 and 55 may be formed as a unit, their differing diameters would thus cause certain difficulties in the milling thereof. I have therefore found that it is more convenient and economical to form these elements separately, and to secure them together, as by pins or rivets 64.

In the example illustrated, throttle control is effected through gears 55 and 57, during the time the control lever is actuated to shift progressively through higher forward speed ratios. As best appears from Fig. 3, each of these gears 55—57, as well as the gears 54 and 56, are of so-called mutilated or fragmentary type, their peripheries being provided only partially with gear teeth, such teeth being disposed in the case of gears 55 and 57, in spaced groups, each group of teeth consisting of the same, or of differing numbers of individual teeth. As will hereinafter appear from the description of the connection from rack 50 to the transmission shaft 31, a continuous progressive movement of lever 34 results in a continuous movement of shaft 52. Such movement of shaft 52 results in an intermittent rocking of shaft 58, as the gear 55 engages pinion 57 successively through the different groups of teeth on the gear 55. However, as any given group of teeth on the gear 55 passes clear of the teeth on pinion 57, it will appear that spring 62 causes pinion 57 to return to a normal position of rest, as shown in Fig. 2, which position corresponds to a closed position of the throttle. The same cycle of events will take place following placement of the gear-engaging head 42 in any one of the forward speed gears, which event also follows engagement of the friction clutch. Otherwise expressed, the peripheral spaces intervening the several groups of gear teeth, say on gear 55, correspond to the operative position of parts when transmission controls and clutch engagement are being effected.

The relation prevailing between gears 54 and 56 is, in principle, the same as that existing between gears 55 and 57, except that each of gears 54 and 56 is provided with only a single group of gear teeth. The angular relation of gear 54 with respect to gear 55 is such that gears 54 and 56 are operative to effect throttle control only when, as hereinafter appears, the control lever 34 is disposed in its "reverse" position. For convenience of reference to the drawings, each of the groups of gear teeth, on gears 54 and 55, is indicated at 75, and the spaces intervening such groups indicated by numeral 76.

Proceeding now to a description of the connection from the lever 34, particularly the portion 36, for the purpose of effecting gear ratio selection, it will appear that as the control lever is moved forwardly or backwardly, there will occur a rotation of pinion 51, and a corresponding rotation of the gear 53. The gear 53 is, like gear 55 for example, characterized by spaced groups of teeth, such as 77, and intervening peripheral spaces 78. As the rack 36 is actuated through lever 34, the groups of teeth 77 are successively enmeshed with a rack 65, formed as a part of, or secured to a plate element 66. The plate is constrained to longitudinal movement within the case, as by a tongue portion 67 slidably operable between spaced guides 68 carried within or formed as a part of the cover of the case. Formed as a part of, or detachably secured to the plate 66, is an annular arm 69, which serves to embrace, and thus operatively to actuate, the nonrotatable collar 38 for effecting endwise movement of the shaft 31. It thus appears that a shifting movement of lever 34, about its axis 35, results through pinions 51 and 53 and shaft 52, in a longitudinal endwise movement of the member 66, and a corresponding movement of shaft 31, for purposes of selective placement of the head 42 within the several speed change controlling gears. Since movement of shaft 31 results also in clutch actuation, as heretofore noted, it will have appeared that the organization of Fig. 3 serves to control, in sequence, the gear head 42, the clutch and the throttle.

It will be noted as desirable that a reversal of the cycle of throttle control movements be avoided as the lever 34 is actuated to control the transmission in proceeding from higher into and through the lower forward-speed gear ratios. In order to avoid such throttle actuation, the gear or pinion 57 is provided (Fig. 3) with a pawl 79 which operatively engages appropriate notches 80 formed on the rock shaft 58 within the gear 57. It thus appears that the gear 57 actuates shaft 58 only as the gear is rotated clockwise, with reference to Fig. 3. Since throttle actuation takes place through gears 54 and 56 only at a time when gears 55 and 57 are not operatively engaged, there is no strict necessity of a corresponding pawl assembly within the gear 56.

The sizes of the several gears, the number of teeth thereof, and the number of teeth in each of the several groups carried by the mutilated gears, are so arrived at that a predetermined range of forward and backward movement of the lever 34 actuates the member 69 and hence the shaft 31 through a distance sufficient to enable control placement of the driving head 42 and the several clutch actuating cams 45 in any of their several operative positions.

My preference, for simplicity of construction, is also to locate the shaft 58 and hence the axes of gears 56 and 57 in a somewhat laterally offset position with respect to shaft 52, as appears in Fig. 3. By this arrangement, the groups of teeth on the mutilated gears 53 and 55, may be diametrically opposed on each gear, and the groups may be located in corresponding angular relation as between the two gears 53 and 55, thus assuring that when the teeth 77 of gear 53 engage the rack 65, the teeth 75 will be out of engagement with the gear teeth of pinion 57. There is thus created a definitely sequential, lost motion connection, establishing an assured lag between the transmission and clutch control movements and the throttle control movements. The exact number of gear teeth and the grouping of teeth on the mutilated gear, as well as the number of teeth in each of such groups, is best arrived at experimentally in any given automotive organization, due to the varying gear ratios provided through different transmissions.

It will appear that the throttle control organization illustrated, say by Figs. 2 and 3, may, with or without minor modifications of the racks, gears, etc., be adapted to use with any conventional or usual type of transmission employing a longitudinally operable shifting control. It will accordingly appear that the structure illustrated, is susceptible of numerous modifications in fully attaining the objects above set forth, the present detailed description covering only a single illustrative example. A number of changes may be made in the parts, their combinations and structure, without departing from the spirit and intended scope of the invention, as defined by the appended claims.

I claim:

1. In an engine, transmission and clutch assembly, a combined gear-ratio shifting and clutch-actuating member, a control lever therefor, and a gear connection of lost-motion type, actuated by said lever for controlling the speed of said engine, conformably to and sequentially with predetermined control placements of said shifting and clutch-actuating member.

2. In an engine and transmission assembly, a control member, a gear element connected to the throttle of the engine, a coacting gear element movable responsively to said member to effect a predetermined sequence of throttle control movements, and a geared connection of intermittent type, disposed operatively between said control member and the transmission, and adapted to effect speed-change control movements alternately with said throttle control movements.

3. In a power plant including a prime mover, a clutch and a speed-change transmission, a control element, a common connection from said element for actuating the clutch and varying the speed ratio through said transmission, and gearing of intermittent type, constituting an additional connection from said element for varying the speed of said prime mover, sequentially with respect to clutch-actuating and speed-change movements of said control element.

4. In an engine, transmission and clutch assembly, a clutching and shifting lever, an engine throttle control adapted for actuation by the lever, and a plurality of related gears, rotatable in response to movement of the lever in one direction to cause, first, a change in effective gear ratio through the transmission, actuation of the clutch, and thereafter to actuate the throttle control.

5. In an engine and transmission assembly, a transmission control lever, a transmission control element, a throttle control element, and a plurality of gears, each of fragmentary or mutilated type, and operatively connected to said control lever, said gears adapted for alternately connecting and disconnecting one of said elements from said control lever, as said lever is actuated in a given direction through a portion of its normal path of movement.

6. In an engine and transmission assembly, a transmission control lever, an engine throttle control member adapted for actuation by said lever, a gear-change member adapted for actuation by said lever, and a device adapted for interconnecting and disconnecting said gear change member and lever as the lever is actuated to effect successive movements of the throttle control member, said devce including a gear movable by said lever, and a coacting gear element, the gearing being of intermittently engaged, lost-motion type, arranged to effect a sequence of alternate gear-change and throttle-control movements, responsively to movement of said lever in a given direction.

7. In an engine and transmission assembly, a transmission control lever, a gear element and a pinion element adapted for actuation responsively to movement of said lever, one of said elements having connection with the engine throttle, and arranged to produce a sequence of throttle control movements as said lever is moved in one direction, one of said elements arranged for movement free of the engine throttle, when the lever is moved in an opposite direction.

8. In a power plant including an engine and a friction clutch, a clutch control lever, a throttle control member adapted for actuation by said lever, and an assembly of gears and coacting, incompletely toothed, gear elements, operatively associated with said lever and adapted to coordinate, sequentially, engine-accelerating movements of said throttle control, and clutch-engaging movements of said control lever.

9. In a power plant including an engine, a friction clutch and a transmission, an engine throttle, a lever in controlling relation with the engine throttle, the clutch and the transmission, and gearing elements serving as connections thereto, from said lever, adapted to permit a control of the throttle, independently of controlled actuation of the clutch, said gearing elements being selectively engaged and disengaged in different rotative relation.

10. In an engine and transmission assembly, a rotatable control shaft adapted for the conjoint control of the engine speed, and transmission speed ratios, a control lever for actuating said shaft, a lost-motion geared connection from said shaft to a shiftable control element of the transmission, and a second lost-motion connection from said shaft to the engine throttle.

11. In an engine and transmission assembly, in combination, a rotatable control shaft, gearing carried by said shaft for actuating a transmission speed change control element, gearing associated with said shaft for actuating the throttle of the engine, said gearing being of intermittent type and the elements of the gearing being timed to effect alternate operative control connections with the engine and transmission as said shaft is moved in a given direction.

12. In an engine and transmission assembly, a control member, a connection from said member for varying speed ratio through the transmission, a throttle control shaft, and a geared connection from said control member to said throttle control shaft, the connections to said throttle and transmission being arranged for alternate actuation by said control member.

13. In an engine and transmission assembly, a rotatable control member, means for actuating said member for purposes of throttle and transmission control, means, including fragmentary gear portions movable by said member for connection thereof for speed change control purposes, and means including fragmentary gear elements, constituting a connection from said member to the throttle of the associated engine.

14. In an engine and transmission assembly, a fragmentary gear, a pinion coacting therewith and operatively connected to the engine throttle, means for actuating said gear for gear-control purposes, and means, movable responsively to the first said means for transmission control purposes, the last said means adapted for functional transmission control alternately with the operative connection with said gear and pinion.

15. In an engine and transmission assembly, a coordinated control organization including a rotatable control shaft, a member for actuating said shaft, two fragmentary gear elements movable with said shaft, a gear connection to one of said elements for purposes of speed change control through the transmission, and a gear connection from the other of said elements adapted to actuate the engine throttle, said connections being angularly so related to said shaft as to effect their alternate actuation upon rotation of said shaft.

16. In an engine and transmission assembly, a combined gear-ratio and throttle control organization including a rotatable control shaft, an element for rotating said shaft, a pair of mutilated control gears mounted on said shaft, each of said gears characterized by angularly spaced groups of gear teeth, gear elements coacting with said mutilated gears, and so related as to be alternately actuated by the respective control gears, members connecting one of the last said gear elements to the engine throttle and connecting the other of the said elements to the transmission for variation of speed ratios through the transmission.

17. In combination in an engine and transmission assembly, a combined engine and transmission control organization, including a control lever, a rack carried by said lever, a pinion engaging said rack, a shaft adapted to be actuated by said pinion, a gear carried by said shaft, a transmission control rack engaging said gear and means constituting a lost-motion connection from said shaft to the engine throttle.

18. In combination in an engine and transmission assembly, a combined engine and transmission control structure, including a control lever, a shaft, a gear connection between said lever and said shaft, an intermittent connection from said shaft to the engine throttle, and an intermittent connection from said shaft for control of the transmission, said connections including geared couplings providing for alternate operative transmission-shifting and throttle-control movements.

19. In an engine and transmission assembly, a control member, a shaft adapted for rotation by said member, an element carried by said shaft and provided with gear teeth, a pinion adapted to be actuated by said element, a connection from said pinion to the throttle of the engine and a lost-motion shifting connection from said shaft to the transmission.

20. In an engine and transmission assembly, a coordinated control organization therefor including a pivoted control lever, a rack carried at one end of said lever, a pinion engaged by said rack, a shaft carrying the pinion, two gears of fragmentary type carried by said shaft, and each characterized by angularly spaced groups of gear teeth, intervened by spaces without gear teeth, a pinion adapted to be enmeshed with one of said fragmentary gears, a rock shaft carrying the pinion, a pawl connection between said pinion and rock shaft, a connection from the rock shaft to the engine throttle, whereby said rock shaft may be rocked in either direction to open the engine throttle, a spring biasing the rock shaft toward throttle-closing position, a rack adapted to be enmeshed with the other of said fragmentary gears, a transmission shaft adapted to move responsively to said rack, and having a portion adapted for selective engagement with different speed change units of the transmission, a third fragmentary gear carried by the first said shaft, and a pinion secured to said rock shaft and adapted to be operatively engaged by the last said fragmentary gear, the said fragmentary gears being angularly so related as alternately to actuate the rock-shaft pinions.

EUGENE S. BUSH.